Patented July 2, 1974

3,822,290
4,7-DIHYDRO-2-ISOPENTYL-2-METHYL-1,3-DIOXEPIN

Robert F. Tavares, Cedar Grove, N.J., Jack Agran, Brooklyn, N.Y., and William M. Easter, Hasbrouck Heights, N.J., assignors to Givaudan Corporation, Clifton, N.J.
No Drawing. Filed Mar. 15, 1973, Ser. No. 341,628
Int. Cl. C07d 17/00
U.S. Cl. 260—338                                    1 Claim

ABSTRACT OF THE DISCLOSURE

An unsaturated ketal, 4,7-dihydro-2-isopentyl-2-methyl-1,3-dioxepin prepared by the condensation of 2-butene-1,4-diol with 5-methyl-2-hexanone is useful as an odorant for perfume.

BACKGROUND OF THE INVENTION

(1) Field of Invention

This invention relates to a novel unsaturated cyclic ketal and its use as an odor agent and more specifically to a novel dioxepin compound and its use as an odorant for perfume.

(2) The Prior Art

It is known to the art to condense ketones with polyhydric alcohols to prepare the corresponding cyclic ketals. However, it has not been known heretofore that the condensation of the unsaturated polyhydric alcohol, 2-butene-1,4,-diol with the ketone, 5-methyl-2-hexanone would result in an unsaturated cyclic ketal which would have properties rendering the compound especially useful as a perfume odor agent. As will hereinafter be disclosed, saturated cyclic ketal compounds closely related structurally to the unsaturated ketal compound of the present invention do not exhibit the odor properties exhibited by the unsaturated cyclic ketal of the present invention, 4,7-dihydro-2-isopentyl-2-methyl-1,3-dioxepin.

SUMMARY OF THE INVENTION

In accordance with the present invention, there is provided the unsaturated cyclic ketal, 4,7 dihydro-2-isopentyl-2-methyl-1,3-dioxepin, the ketal being useful as an odorant for perfumes and exhibiting a floral odor with a linalool, coriander character.

PREFERRED EMBODIMENTS

The unsaturated cyclic ketal of the present invention, 4,7-dihydro-2-isopentyl-2-methyl-1,3-dioxepin is prepared by the condensation of 2-butene-1,4-diol with 5-methyl-2-hexanone in accordance with the following equation:

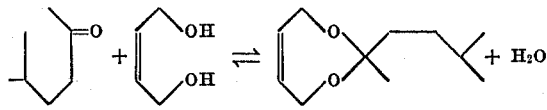

In preparing the unsaturated cyclic ketal, it is preferred to react an equimolar quantity of the 2-butene-1,4-diol and 5-methyl-2-hexanone but an excess of either can be used.

The condensation reaction is preferably affected by incorporating into the reaction medium a catalytic amount, e.g., 0.1 to 2% by weight of an acid catalyst such as an organic or inorganic acid catalyst, for example, an inorganic catalyst such as phosphoric acid, a lower alkyl phenyl sulphonic acid such as para-toluenesulfonic acid or a polycarboxylic acid such as citric acid or tartaric acid. The condensation reaction is suitably conducted by reacting the reagents in the presence of the acid catalyst in an inert reaction solvent. The reaction solvent is suitably an organic compound inert to the reactants and to the unsaturated cyclic ketal reaction product and which forms with water a two-phase azeotrope. Suitable reaction solvents include aliphatic hydrocarbons such as hexane and cyclohexane and aromatic hydrocarbons such as benzene, toluene, xylene and the like.

The condensation reaction can be conducted at room temperature (37° C.) or even lower, but is preferably conducted at elevated temperatures (up to 200° C. or even higher) and most preferably is conducted at the boiling point of the two-phase azeotrope that is formed until no further water of condensation separates in a Dean-Stark trap. The time required for the reaction to go to completion (i.e., when no further water of condensation separates in the Dean-Stark trap) can also vary over a wide range (from less than 10 minutes to well over 48 hours) depending upon any particular set of reaction conditions selected (i.e., the particular catalyst, solvent, if any, or apparatus used, whether or not the reaction is conducted at elevated temperatures, the scale on which the reaction is conducted, the relative amounts of the reactants and products present in the reaction, the efficiency with which water is removed from the reaction to increase the rate at which the equilibrium is shifted in the desired direction, etc.).

After completion of the condensation reaction, the reaction mixture is cooled, if the reaction is conducted at elevated temperature, generally to room temperature and washed with a base such as a suitably concentrated sodium hydroxide to destroy the catalytic activity of the acidic catalyst and thereby prevent a reversal of the equilibrium of the reaction. The mixture is then washed with water to neutrality and the reaction medium solvent is thereupon removed by distillation and the residue distilled under reduced pressure.

The compound, 4,7-dihydro-2-isopentyl-2-methyl-1,3-dioxepin has an interesting fresh floral odor with a linalool, coriander character. The 4,7-dihydro-2-isopentyl-2-methyl-1,3-dioxepin has great value in perfumery because of its fresh floral nuances and its intensity enhancing properties. It is most useful in effecting citrus, amber type notes. The compound can be used in most perfumes and fragrances in the ratio of about 1 to 200 parts per thousand of perfume compositions containing the compound. Larger quantities of the 4,7-dihydro-2-isopentyl-2-methyl-1,3-dioxepin, e.g., 20 to 90 percent by weight of the perfume formulation can be used to achieve special effects.

The dioxepin compound can be used to prepare odorant compositions which can be used as odorant bases for the preparation of perfumes and toilet waters by adding the usual alcoholic and aqueous diluents thereto; approximately 15–20% by weight of base would be used for the former and approximately 3–5% by weight would be used for the latter.

Similarly, the base compositions can be used to odorize soaps, detergents, cosmetics, or the like. In these instances a base concentration of from about 0.5 to about 2% by weight can be used.

The following Examples are provided to illustrate further the practice of the present invention, but are for the purposes of illustration of preferred embodiments only and should not be construed as limiting.

EXAMPLE I

Preparation of 4,7-dihydro-2-isopentyl-2-methyl-1,3-dioxepin

To a one liter flask equipped with heating jacket, agitator and condenser fitted with a Dean-Stark trap was charged 136 grams (1.2 mole) 5-methyl-2-hexanone, 88 grams (1.0 mole) 2-butene-1,4-diol, 160 grams cyclohexane, 2 grams citric acid and 0.3 grams hydroquinone.

The mixture was heated with vigorous agitation at reflux (87–97° C.) until water no longer continued to be distilled from the reaction mixture (24 hours). The reaction mixture was cooled to room temperature and the citric acid neutralized by washing the reaction mixture with a 5% aqueous solution of sodium hydroxide and then with water. The reaction mixture was then distilled to remove the cyclohexane and the oil vacuum distilled to obtain 152 grams (83% of theoretical) of 4,7-dihydro-2-isopentyl-2-methyl-1,3-dioxepin having a boiling point of 94° C. at a pressure of 9.0 millimeters of mercury (refractive index, $N_D^{20}$=1.4523). Analysis for carbonyl content by IR showed 0.0% carbonyl and VPC analysis showed the compound to have a purity of 97.4%.

EXAMPLE II

Use of 4,7-dihydro-2-isopentyl-2-methyl-1,3-dioxepin as an odorant

A jasmine perfume was formulated with the 4,7-dihydro-2-isopentyl-2-methyl-1,3-dioxepin prepared as in the Example I. The composition of the perfume formulation is provided in Table I below.

TABLE I

Jasmine perfume

| Ingredient: | Parts by weight |
|---|---|
| Benzyl acetate | 230 |
| Hexylcinnamic aldehyde | 68 |
| Cananga oil | 32 |
| Linalool | 133 |
| γ-Undecalactone | 2 |
| Hydroxycitronellal | 112 |
| Musk ambrette | 22 |
| Hydroxycitronellal-methyl anthranilate Schiff Base | 2 |
| Phenylethyl alcohol | 212 |
| p-Cresyl phenyl acetate 10% | 2 |
| Sandalwood oil | 45 |
| Ylang oil | 20 |
| Lemon oil | 20 |
| 4,7 - dihydro - 2 - isopentyl - 2 - methyl - 1,3-dioxepin | 100 |
| | 1,000 |

The addition of 4,7-dihydro-2-isopentyl-2-methyl-1,3-dioxepin at a concentration of 10 percent by weight lends a fresh floral lift to the jasmine perfume. The perfume without this dioxepin compound is not as floral or as rounded and is not as desirable to the perfumer.

For purposes of contrast, the procedure of Example I was repeated with the exception that 1.0 mole concentration of a variety of saturated aliphatic diols closely related structurally to 2-butene-1,4-diol were substituted for the 2-butene-1,4-diol in the reaction medium of the Example to prepare a series of saturated cyclic ketals. The saturated cyclic ketals prepared in this manner are listed in Table II below.

TABLE II.—SATURATED CYCLIC KETALS

| Compound number | Cyclic ketal | Diol reacted with 5-methyl-2-hexanone to prepare ketal |
|---|---|---|
| 1 | 2-isopentyl-2-methyl-1,3-dioxepane | 1,4-butanediol. |
| 2 | 2,4-dimethyl-2-isopentyl-m-dioxane | 1,3-butanediol. |
| 3 | 2-isopentyl-2,4,5-trimethyl-1,3-dioxolane | 2,3-butanediol. |
| 4 | 2-isopentyl-2,4,5,5,-tetramethyl-m-dioxane | 2,2-dimethyl-1,3-butanediol. |
| 5 | 2-isopentyl-2-methyl-m-dioxane | 1,3-propanediol. |
| 6 | 2,4-dimethyl-2-isopentyl-1,3-dioxolane | 1,2-propanediol. |
| 7 | 2-isopentyl-2,5,5-trimethyl-m-dioxane | 2,2-dimethyl-1,3-propanediol. |

None of the saturated cyclic ketals listed in Table II above exhibited any odorant properties useful in perfumery. When it was attempted to prepare a perfume composition of the type illustrated in Example II above by substituting each of the saturated cyclic ketals of Table II for the 4,7-dihydro-2-isopentyl-2-methyl-1,3-dioxepin, no improvement in the perfume odor was obtained and, in fact, in most cases, a detrimental effect was observed.

What is claimed is:

1. 4,7-dihydro-2-isopentyl-2-methyl-1,3-dioxepin.

References Cited

UNITED STATES PATENTS

| 3,116,298 | 12/1963 | Sterling et al. | 260—338 |
| 3,240,702 | 3/1966 | Monroe | 260—338 |
| 3,410,871 | 11/1968 | Sturzenegger et al. | 260—338 |
| 3,584,010 | 6/1971 | Marbet | 260—338 |

OTHER REFERENCES

Kent C. Brannock et al.: Jour. Org. Chem., vol. 21 (1956), pp. 1366–68.

Dexter B. Pattison: Journ. Org. Chem., vol. 22 (1957), pp. 662–664.

Chemical Abstracts, vol. 72 (1970), 1000663y.

NORMA S. MILESTONE, Primary Examiner

U.S. Cl. X.R.

252—522